US008244491B1

(12) United States Patent
Zhang

(10) Patent No.: US 8,244,491 B1
(45) Date of Patent: Aug. 14, 2012

(54) STATISTICAL STATIC TIMING ANALYSIS OF SIGNAL WITH CROSSTALK INDUCED DELAY CHANGE IN INTEGRATED CIRCUIT

(75) Inventor: Lizheng Zhang, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 771 days.

(21) Appl. No.: 12/343,262

(22) Filed: Dec. 23, 2008

(51) Int. Cl.
*G06F 17/50* (2006.01)

(52) U.S. Cl. .......... 702/69; 716/108; 716/129; 716/113; 716/115

(58) Field of Classification Search .............. 702/69, 702/179, 181; 716/108, 129, 113, 115
See application file for complete search history.

(56) References Cited

U.S. PATENT DOCUMENTS

| 7,359,843 B1 | 4/2008 | Keller et al. | |
| 7,761,826 B1 * | 7/2010 | Thanvantri et al. | 716/108 |

OTHER PUBLICATIONS

Khurana, P. and Jacobs, M., "Practical Applications of Statistical Static Timing Analysis", EE Times, Dec. 18, 2006.
Liu, B. et al., "SSTA-SI: Statistical Static Timing Analysis in the Presence of Signal Integrity Effects", IEEE Trans. on Computer-Aided Design of VLSI Systems, 2007.
Nitta, I. et al., "Statistical Static Timing Analysis Technology", Fujitsu Sci. Tech. J., 43,4, pp. 516-523, Oct. 2007.
Teng, C. and Doekar, R., "Signoff for Manufacturability—An absolute necessity at 45nm", EDA DesignLine, Oct. 8, 2007.
Kahng, A. et al., "Statistical Timing Analysis in the Presence of Signal-Integrity Effects", IEEE transactions on Computer-Aided Design of Integrated Circuits and Systems, vol. 26, No. 10, Oct. 2007, pp. 1873-1877.
Teng, C. and Doekar, R., "Next-Generation Signoff Analysis Tackles Electrical, Physical, and Manufacturing Challenges", Cadence White Paper, Cadence Design Systems, Inc. 2008, pp. 1-8.
Teng, C. and Doekar, R., "Sign-off smartly with SSTA", EE Times-Asia, May 1-5, 2008, pp. 1-4.

* cited by examiner

*Primary Examiner* — Drew A Dunn
*Assistant Examiner* — Hien Vo
(74) *Attorney, Agent, or Firm* — Schwegman, Lundberg & Woessner, P.A.

(57) ABSTRACT

A method is provided to evaluate crosstalk effect of aggressor switching upon victim net signal transition time within an integrated circuit comprising: combining a first probability density function (PDF) of first aggressor switching time in response to a first input signal to an aggressor net driver and a second aggressor switching time in response to a second input signal to the aggressor net driver; determining a delay change curve that represents a relationship between delay change of arrival time of a victim net signal transition and relative alignment of the aggressor net driver switching time and a victim net driver switching time; and determining a third PDF of delay change of a transition of the victim net signal based upon the combination and the delay change curve.

19 Claims, 8 Drawing Sheets

STATISTICAL STATIC TIMING ANALYSIS OF SIGNAL WITH CROSSTALK INDUCED DELAY CHANGE IN INTEGRATED CIRCUIT

BACKGROUND OF THE INVENTION

1. Field of the Invention

The invention relates in general to integrated circuits, and more particularly, to minimization of crosstalk effects in circuits.

2. Description of the Related Art

Signal integrity refers to the degree to which a signal within an integrated circuit faithfully propagates to its intended destinations within its allocated timeframe. Static timing analysis (STA) is one approach to analyze signal integrity. More recently, statistical static timing analysis (SSTA) has been used to analyze signal integrity in circuits designs in which fabrication process variations have a greater impact upon signal integrity.

STA involves computing the expected timing of a digital circuit to verify that all signals will arrive neither too early nor too late, and hence proper circuit operation can be assured. STA typically aims to find worst-case delay of a circuit over all possible input combinations. Integrated circuit manufacturing processes are inherently imperfect. In some circumstances, traditional STA techniques cannot adequately model the variability inherent in semiconductor manufacturing processes.

For example, at extremely small dimensions such as 45 nm, semiconductor manufacturing process control is difficult, and even slight variations in the duration, temperature and chemical concentrations can result in physical differences in devices and interconnects from one wafer to the next and from one die to the next leading to variations in their electrical behavior. Even if the amount of process variation remains the same in absolute terms as in previous designs with larger dimensions, that variation accounts for a greater percentage change in overall device performance at the smaller design dimensions. In the past, STA based signal integrity techniques often compensated for such process variability through aggressive insertion of guard bands or by using multiple corners involving different timing scenarios to reflect different manufacturing conditions. Unfortunately, such a corner-based approach can be overly pessimistic since it can involve timing scenarios that have an extremely small likelihood of occurring.

Fabrication process based variations in integrated circuits has resulted in increasing reliance upon SSTA techniques that treat delays as probability density functions (PDFs) that take into account the statistical distribution of parametric variations when analyzing a circuit. The basic SSTA method defines random variations of delay as random variables and calculates a probability density function (PDF) of circuit delay. SSTA expresses pin-to-pin delays and arrival times as PDFs; whereas STA typically expresses such values as single numbers.

SSTA solutions typically use a sensitivity-based approach to model the effect of variation on timing. This ordinarily involves establishing how change in a particular device or interconnect parameter, such as oxide or wire thickness, affects a desired property, such as slew or capacitance. This "sensitivity" to the parameter in conjunction with its probability distribution (e.g., mean and standard deviation) provides a statistical model describing the probability that a parameter will have a certain effect on a device or interconnect property. Device parameters may include oxide thickness, gate length and width, voltage threshold, and interconnect parameters can include metal width, thickness, spacing and dielectric properties. A subset of these parameters may be selected which have a significant impact on timing and used for characterization. Careful selection of parameters is important in order to keep the runtime for SSTA manageable while maintaining accuracy.

It is possible to then use this parameter variation information for timing analysis by generating models that define sensitivities to these parameters. For a circuit, these sensitivities, are typically are generated during library characterization, represent how a change in a particular parameter affects circuit performance such as delay, slew, setup, or hold time. For interconnect, these sensitivities represent how a change in each parameter affects resistance, capacitance, and inductance, and are generated during extraction. The sensitivities for circuit elements (e.g., gates) and interconnects along with the distribution information for each parameter can be used to generate PDFs for arrival time (data path), required time (clock path), and slack which include the overall effect of all the parameters on timing. A PDF, therefore, can represent variability of circuit characteristics such as signal arrival time, required time, and slack caused by variability of multiple fabrication processes.

FIG. 1 is an illustrative chart of signal arrival time showing hypothetical best case and worst case arrival times for a signal computed using STA and showing a hypothetical PDF of arrival time of the signal determined based upon SSTA. In this example, the worst corner case arrival time is 2.3 ns according to STA. However, the 3-sigma yield point of the PDF, which provides a 99.9% confidence level, has a nominal arrival time of 1.9 ns. The shaded region indicates the reduction in worst case error margin that can be achieved in this illustrative example through sue of SSTA instead of STA. Thus, in this hypothetical example, SSTA allows a designer to shave off 400 ps from the cycle time, a path performance gain of 18.2%. The use of SSTA, therefore, can result in less pessimistic signal arrival time estimates, which can lead to in improved circuit design.

Crosstalk effects on signal integrity is becoming an increasingly important factor in circuit design. Recent advances in process technology scales the aspect ratio of wires to be taller and thinner to control wire resistance. A side effect of this scaling is that coupling capacitance between wires becomes the dominant portion of the total wire capacitance. In addition, signal transition times have become faster resulting in stronger aggressors on adjacent victim wires. Moreover, increasingly tighter timing margins require more accurate timing analysis and less overestimation of delay.

FIG. 2 is an illustrative drawing of a victim net 204 and an aggressor net 202 and a curve 206 representing aggressor-dependent delay change of arrival time of a victim net signal transition. It will be appreciated that an integrated circuit design ordinarily includes a multitude of gates and nets disposed nearby to each other so as to result in victim-aggressor relationships of the type described herein. STA in the presence of crosstalk typically involves finding a worst-case (i.e., corner case) delay among possible alignments of an aggressor net signal 208 with a victim net signal 210. The victim net 204 includes a victim net driver circuit 212 and a victim net receiver circuit 214. The aggressor net 202 includes an aggressor net driver circuit 216 and an aggressor net receiver circuit 218. Capacitive coupling 220 exists between the victim net and the aggressor net. The victim net driver circuit 212 produces a victim signal 210 that propagates to the victim net receiver circuit 214. The aggressor net driver circuit 216 produces an aggressor signal 208 that propagates to the aggressor net receiver circuit 218. Capacitance 220 between the victim and aggressor nets, 204 and 202, respectively, results in crosstalk between the two nets. The delay change curve 206 represents aggressor switching induced change in delay of a victim signal state transition. More particularly, crosstalk can result in delay changes of signal transitions on both nets. Note that although reference herein is made to 'delay' change, it will be appreciated that depending upon relative aggressor-victim switching directions and aggressor-victim switching time alignments, the victim and/or aggressor-transition may be delayed or speeded up. The family of curves within dashed lines 222 will be used to explain the relationship between aggressor switching and delay change in victim net signal transition from one state to another. The amount of the delay change is a function of not only the value of the cross capacitance 220, but also the relative switching time between the aggressor net 202 and the victim net 204.

Crosstalk delay change is a difference between crosstalk delay and nominal delay. Crosstalk delay change is the extra delay (or speed-up) in a victim net state transition (e.g., switching from logic 0 to 1 or from logic 1 to 0) induced by transitioning of some or all aggressors of the victim net. In general, for crosstalk delay analysis, the maximum of crosstalk delay change (taken absolute value) is of greatest interest. The delay change is positive when victim and aggressors switch in opposite directions and it is used for late arrival time calculation (often referred to as max delay analysis). Similarly, the delay change is negative when victim and aggressors switch in opposite directions and it is used for early arrival time calculation (often referred to as min delay analysis). Nominal delay is a stage delay when aggressors are held quiet (e.g., logical 0 or 1).

FIG. 3 is an enlarged drawing of a family of curves 222 shown in FIG. 2, that conceptually represent the impact of crosstalk upon victim signal transition arrival time. A first curve 302 shown with dashed lines represents a victim net signal transition for a victim net signal transmitted from the victim net driver 212 to the victim net receiver 214. An arrow 304 represents imparting of victim net delay change to the first curve 302 due to crosstalk between the victim net switching transition signal and an aggressor signal having a given alignment with the victim net signal. It will be appreciated that although only a single aggressor net is shown, multiple aggressors may in fact contribute to crosstalk effect upon a victim net. A second curve 306 represents a victim net signal transition as transformed due to crosstalk. A comparison of the first and second curves 302, 306 shows conceptually that the shape of the victim net signal transition has changed due to crosstalk, which corresponds to a change in the effective arrival time of the victim net signal transition at a victim net receiver gate 214.

In STA, there typically will be a range of time, in which a signal transition can possibly happen in a net. This range is usually termed as the switching window of the net. One goal of STA in the presences of crosstalk is to find the worst/best delay change on the net within the corresponding switching window constraints. As explained above, as integrated circuit technology scales down to nanometer dimensions, process variation has become an ever more important factor in signal timing estimation. STA has difficulty modeling such process variation.

Accordingly there is a need to use SSTA during signal integrity analysis to evaluate crosstalk induced delay change in very small dimension circuit designs. The present invention meets this need.

SUMMARY OF THE INVENTION

An aspect of the invention involves evaluation of crosstalk effect of aggressor switching upon victim net signal transition time within an integrated circuit. In some embodiments, a separate PDF is obtained for aggressor switching in response to each of one or more input signals to an aggressor net driver. A combination curve is determined that represents a summation of these separate PDFs. A delay change curve is obtained that represents aggressor-dependent delay change of arrival time of a victim net driver signal transition. A third PDF of delay change of a transition of the victim net driver signal is determined based upon the summation and the delay change curve.

In some embodiments, a PDF of the victim net signal transition time under the influence of aggressor-induced crosstalk is determined based upon the third PDF and a PDF of nominal victim net driver transition time. The PDF of victim net signal transition under the influence of aggressor induced crosstalk can be used to make design determinations during the design and manufacture of integrated circuits.

These and other feature and advantages of the invention will be apparent from the following detailed description of embodiments thereof in conjunction with the illustrative drawings.

DETAILED DESCRIPTION OF THE PREFERRED EMBODIMENTS

The present invention provides a novel method and apparatus for statistical static timing analysis to evaluate the impact of crosstalk upon signal integrity in an integrated circuit. The following description is presented to enable any person skilled in the art to make and use the invention. The embodiments of the invention are described in the context of particular applications and their requirements. These descriptions of specific applications are provided only as examples. Various modifications to the preferred embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
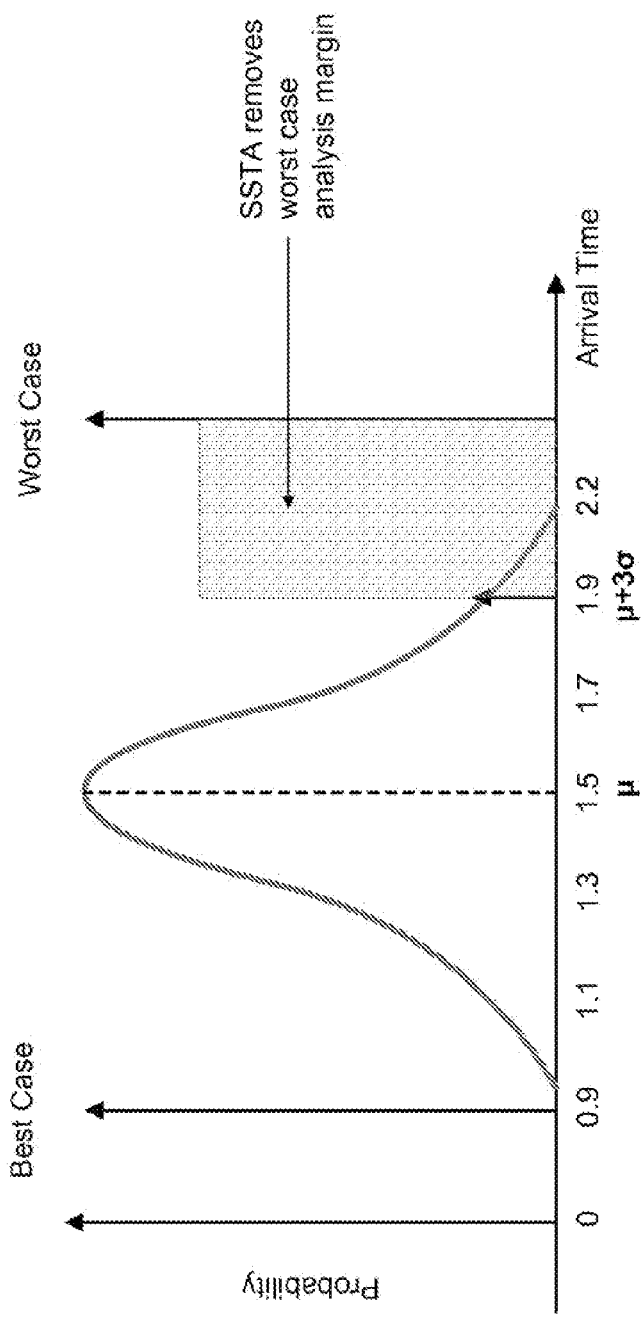
FIG. 1 is an illustrative chart of signal arrival time showing hypothetical best case and worst case arrival times for a signal computed using STA and showing a hypothetical PDF of arrival time of the signal determined based upon SSTA.
Figure 2:
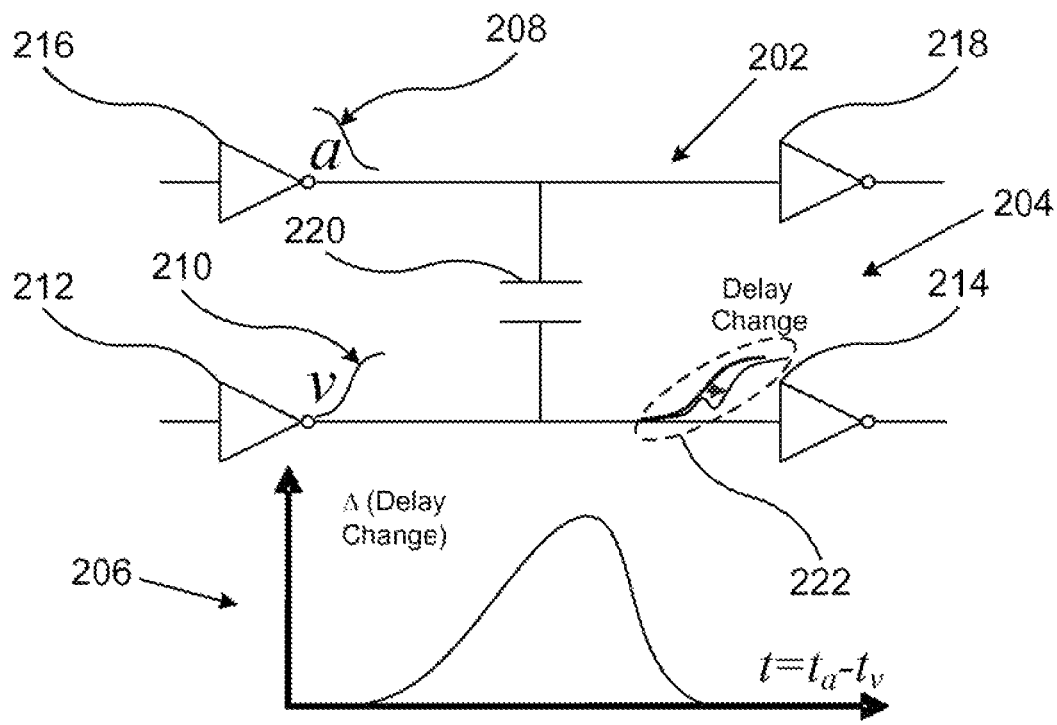
FIG. 2 is an illustrative drawing of a victim net and an aggressor net and a curve representing aggressor-dependent delay change of arrival time of a victim net signal transition.
Figure 3:
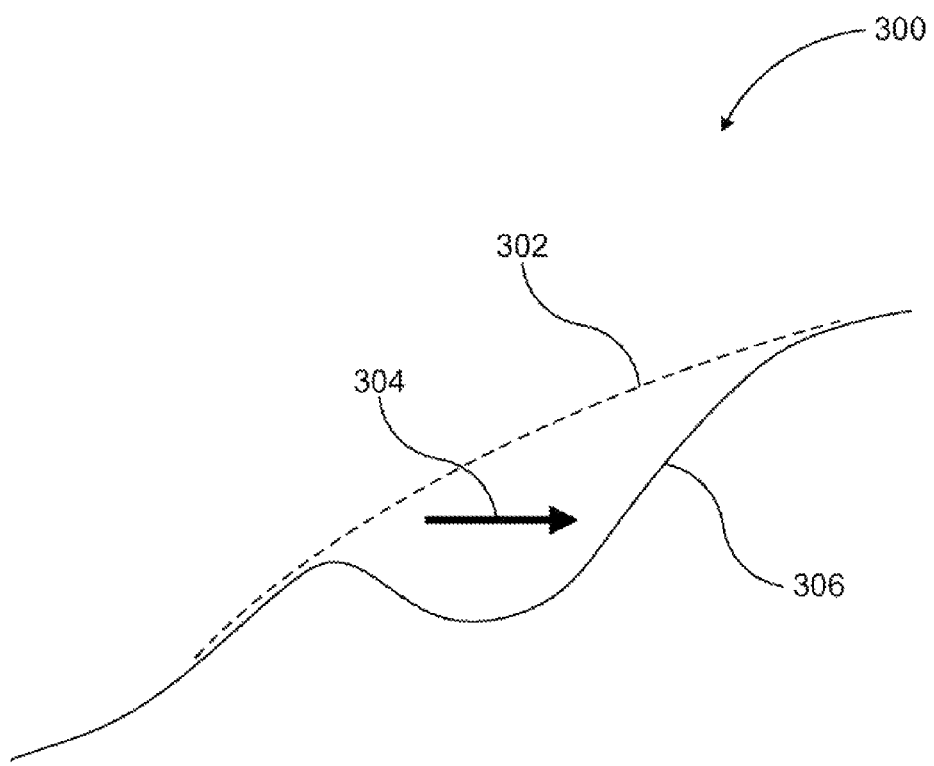
FIG. 3 is an enlarged drawing of a family of curves shown in FIG. 2, that conceptually represent the impact of crosstalk upon victim net arrival time.
Figure 4:
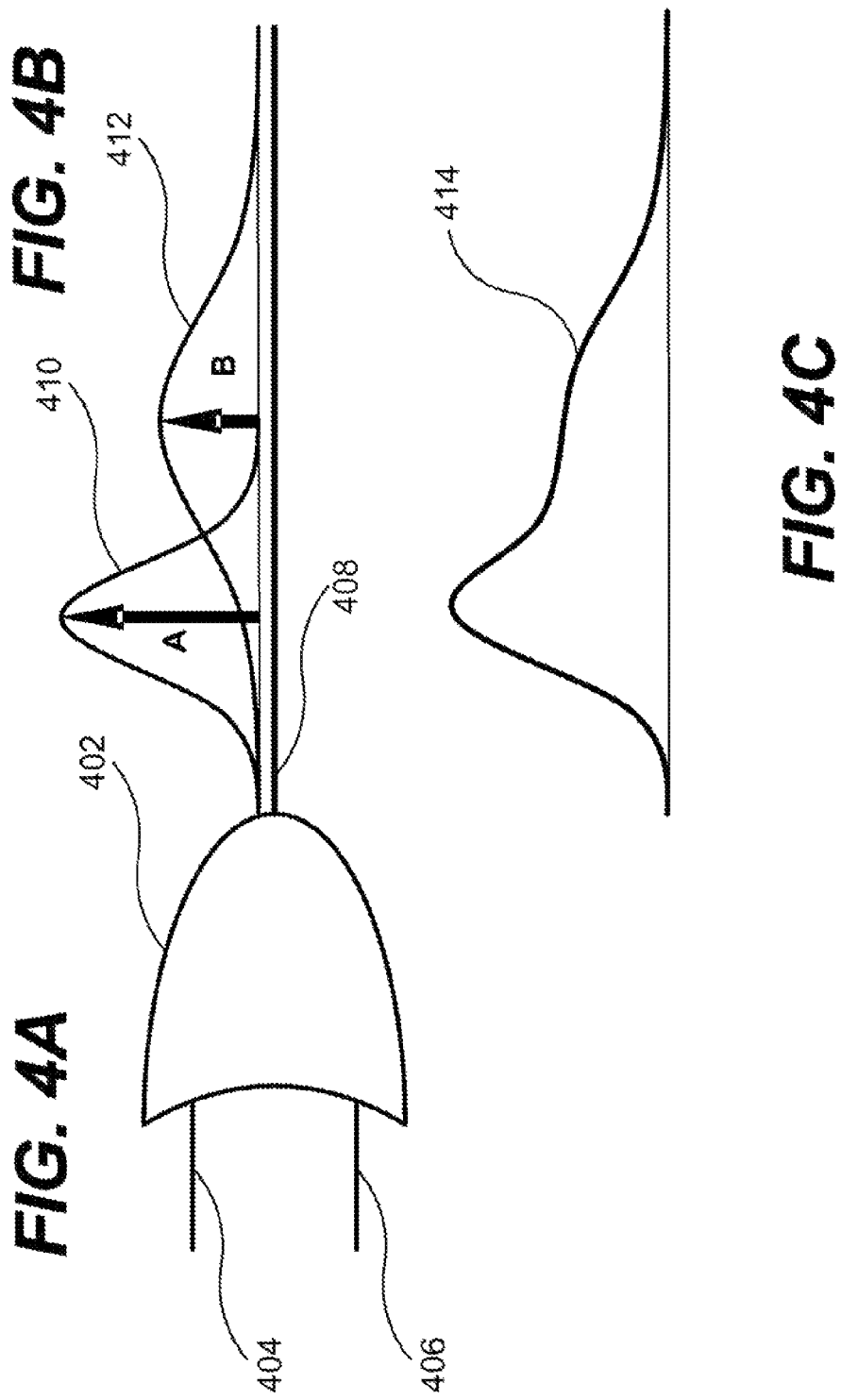
FIGS. 4A-4C are illustrative drawings showing a two input logical OR gate (FIG. 4A), PDFs of signal switching times on an output of the OR gate in response to input signals on each of the two inputs to the gate (FIG. 4B), and a PDFS curve (FIG. 4C) that represents a summation of the PDFs of the signal transition arrival times on the gate output in accordance with some embodiments of the invention.

FIGS. 4A-4C are illustrative drawings showing an aggressor net driver (FIG. 4A), PDFs of signal switching times on an output of the aggressor driver circuit in response to input signals on each of two inputs to the gate (FIG. 4B), and a PDFS curve (FIG. 4C) that represents a summation of the PDFs of the signal transition arrival times on the aggressor driver output in accordance with some embodiments of the invention. In this example, the aggressor net driver circuit comprises a logical OR gate 402 that injects crosstalk noise onto a victim net (not shown). It will be appreciated that at some point in an overall timing analysis of a circuit, a given gate may serve in the role of aggressor net driver and at a different point in such timing analysis, that same given gate may serve in the role of victim net driver.

FIG. 4A shows that the illustrative aggressor net driver OR gate 402 has a first input terminal 404 that receives input signal 'A' and has a second input terminal 406 that receives input signal 'B'. The OR gate 402 also has an output terminal 408. Assuming that the first and second signals, 'A' and 'B' are initially logical 0, then a transition of either of the two signals 'A' or 'B' causes an OR gate output signal on terminal 408 to transition from a logical 0 state to logical 1 state.

FIG. 4B shows within a switching window of the aggressor net driver circuit 402 of FIG. 4A a first PDF curve 410 of the switching time on the output 408 of the gate 402 in response to first signal 'A' on the first input 404 and shows a second PDF curve 412 of the switching time of a transition on the output 408 of the gate 402 in response to a second signal 'B' on the second input 406. The first and second PDF curves 410, 412 are computed using SSTA techniques. In this example, the first and second PDF curves 410, 412 overlap, although principles of the invention apply even if these PDFs do not overlap. The two PDF curves are shown indicate the relative probability densities of switching of the first signal 'A' and the second signal 'B' within the aggressor switching window. The first and second PDF curves 410, 412 may be obtained from the results of a known SSTA processes, which form no part of the present invention and need not be described in detail herein.

FIG. 4C shows a combination curve 414, referred to herein as a "PDFS" curve, that represents a combining of first and second PDF curves 410, 412 of FIG. 4B. In some embodiments, the combining of the PDF curves 410, 412 involves summing the two PDF curves 410, 412 to produce the PDFS curve 414. It will be appreciated that the PDFS curve 414 does not represent an actual probability density function since in some embodiments, it is computed as a summation of PDFs that within the aggressor switching window. Nevertheless, the PDFS curve 414 provides an indication of the combined probability of occurrence of an aggressor signal transition at arbitrary time points within the aggressor switching window. In particular, the integral of the PDFS curve 414 integral (i.e., area under the PDFS curve) over different time intervals within the aggressor switching window provides an indication of the likelihood of the occurrence of an aggressor signal transition within such time intervals. For instance, if the value of the integral of the PDFS curve that spans some time interval within the aggressor switching window is less than one, then that integral value provides an indication that the probability of occurrence of an aggressor transition within that time interval. If on the other hand, the value of the integral of the PDFS curve that spans some larger time interval within the aggressor switching window is greater than one, then that integral value provides an indication that it is always possible to find at least one occurrence of an aggressor transition within that larger time interval.

Although only a single aggressor driver is shown in FIG. 4A, it will be appreciated that the principles of the invention apply to alternate embodiments in which multiple aggressor net drivers (not shown) influence signal transition delay on the victim net (not shown). A respective PDF (not shown) of output switching time is obtained for each of the multiple aggressor drivers. The PDFs of the output switching times of the multiple aggressor net drivers are combined in such alternate embodiments to produce the combination curve.

Figure 5:
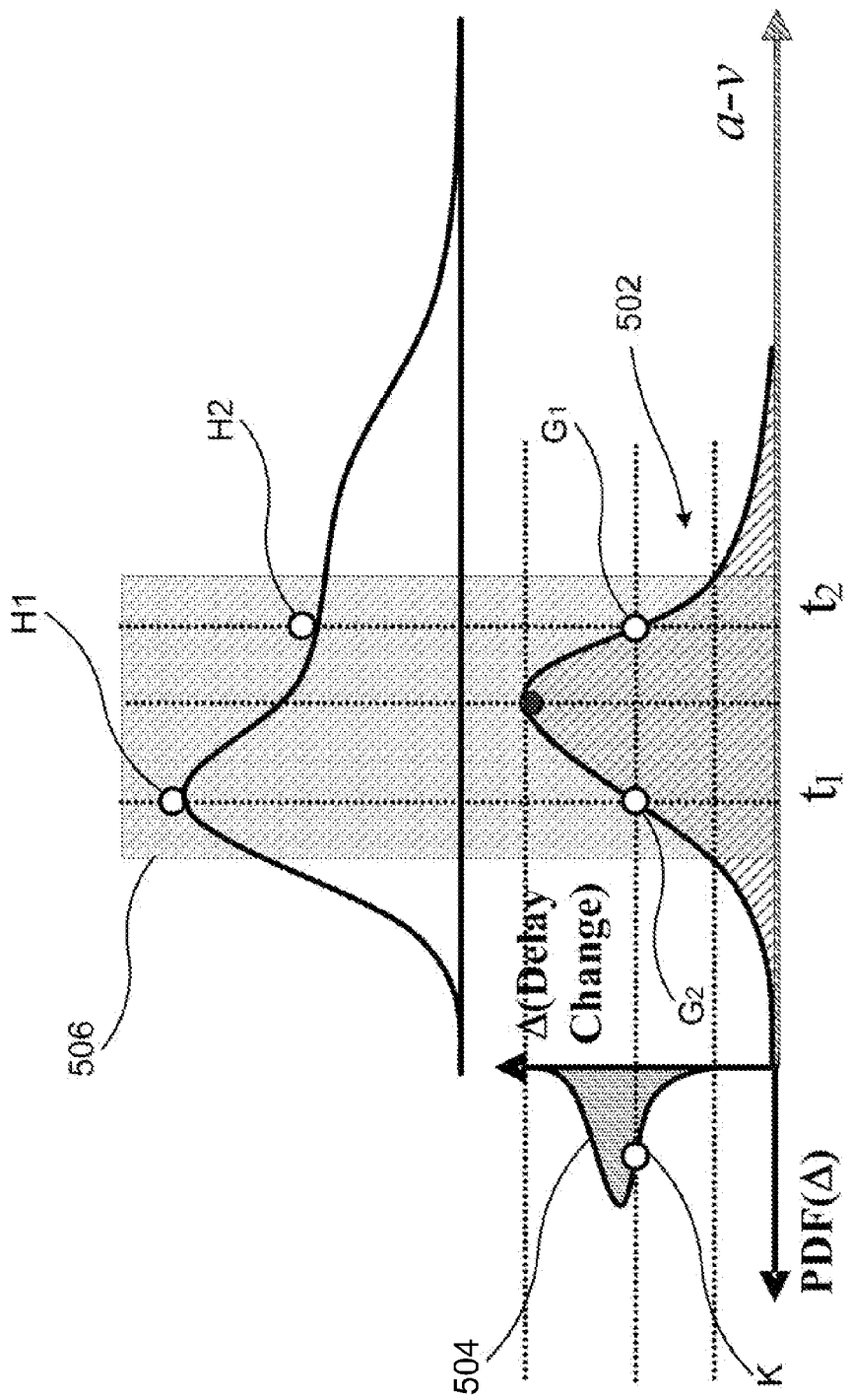
FIG. 5 is an illustrative drawing showing relationships among the PDFS curve of FIG. 4C, a hypothetical signal transition delay change curve of a victim net driver gate resulting from signal transitions of the aggressor driver gate of FIG. 4A, and a delay change PDF curve in accordance with some embodiments of the invention.

FIG. 5 is an illustrative drawing showing relationships among the PDFS curve 414 of FIG. 4C, a hypothetical signal transition delay change curve 502 of a victim net driver gate (not shown) resulting from signal transitions of the aggressor net driver 402 of FIG. 4A, and a delay change $PDF_A$ curve 504 in accordance with some embodiments of the invention. The delay change curve 502 can be obtained through STA and numerous SPICE simulation runs, for example. See for example, commonly assigned U.S. Pat. No. 7,359,843, which is expressly incorporated herein by this reference. Different simulation runs use different alignments of aggressor net driver switching time and victim net driver switching time so as to produce the delay change curve 502, which represents change in victim net transition arrival time at a victim net receiver (not shown) as a function of the relative alignment of aggressor driver switching time and victim net driver switching times.

A rectangular region 506 encompasses a time interval in which the integral of the PDFS curve 414 curve is one. In other words, the region 506 identifies a time interval in which there always will be an occurrence of an aggressor net driver signal transition. The delay change curve 502 represents delay change relative to alignment of aggressor net switching time ($t_a$) and victim net switching time ($t_v$). Thus, the horizontal axis of the delay change curve 502 is ($t_a$-$t_v$). The horizontal axis of the PDFS curve 414 is ($t_a$). It will be appreciated that victim net switching time may be viewed as occurring at a fixed or constant time, and a range of different aggressor net switching time alignments are simulated in order to arrive at the delay change curve 502. The region 506 is selected so as to maximize the value of the delay change within the region 506. Portions of the PDFS curve 414 and delay change curve 502 within the rectangular region 506 are used to compute the delay change $PDF_A$ curve 504.

A rate of change of the delay change curve 502 at a given point on that curve comprises a ratio of change of delay change to change in aggressor alignment associated with that point of the curve 502. Accordingly, the inventors proposed determining the delay change $PDF_A$ curve 504 in accordance with the following formulation.

$$PDF(\delta) = \sum_{f(t_i)=\delta} \frac{PDFS(t_i)}{|f'(t_i)|}$$

Where $PDF(\delta)$ represents the delay change PDF curve 502; function $f(t)$ represents the delay change $PDF_A$ curve 504; $|f'(t_i)|$ represents a derivative of the delay change curve 502 at an aggressor switching time point $t_i$ for a given value of the delay change curve $f(t_i)=\delta$; and $PDFS(t_i)$ represents the value of the PDFS curve 414 at a point of that curve aligned with the time point $t_i$ in the delay change curve $f(t_i)$.

Thus, the $PDF_A$ curve 504 represents a probability density function of arrival time of the victim net driver signal transition based upon the PDFS curve 414 and the delay change curve 502. The time axis of the $PDF_A$ curve 504 is 1/t. In some embodiments, the $PDF_A$ curve 504 is determined point by point in accordance with the following process. A value for point K of the $PDF_A$ curve 504, for example, is computed based upon rates of delay change of the delay change curve 502 at points $G_1$ and $G_2$ and based upon values of the PDFS curve at points $H_1$ and $H_2$. The delay change curve 502 has the same value at both points $G_1$ and $G_2$. A first ratio value is computed representing a ratio of the value of the PDFS curve 414 at $H_1$ to the rate of change of the delay change curve at point $G_1$. A second ratio value is computed representing a ratio of the value of the PDFS curve 414 at $H_2$ to the rate of change of the delay change curve at point $G_2$. The first and second ratios are combined (e.g., summed) to arrive at the value at point K on the delay change $PDF_A$ curve 504. Each point on the $PDF_A$ curve 504 is computed in a similar manner.

A victim net driver circuit signal transition arrival time PDF under the crosstalk effect can be computed as a convolution of a nominal victim net driver circuit signal transition arrival time PDF and the delay change PDF in accordance with the following formulation.

$$PDF_V(t) = \int PDF_{V_0}(t-\tau) \cdot PDF_A(\tau) \cdot d\tau$$

Where $PDF_{V_0}$ represents a nominal victim net driver circuit signal transition arrival time; $PDF_A$ represents the delay change PDF computed above; and $PDF_V$ represents victim net driver circuit signal transition arrival time PDF under the crosstalk effect. In the above formulation. "t" is the victim switching time, and "τ" is a convolution variable. The $PDF_V$ may be obtained from the results of known SSTA techniques.

Figure 6:
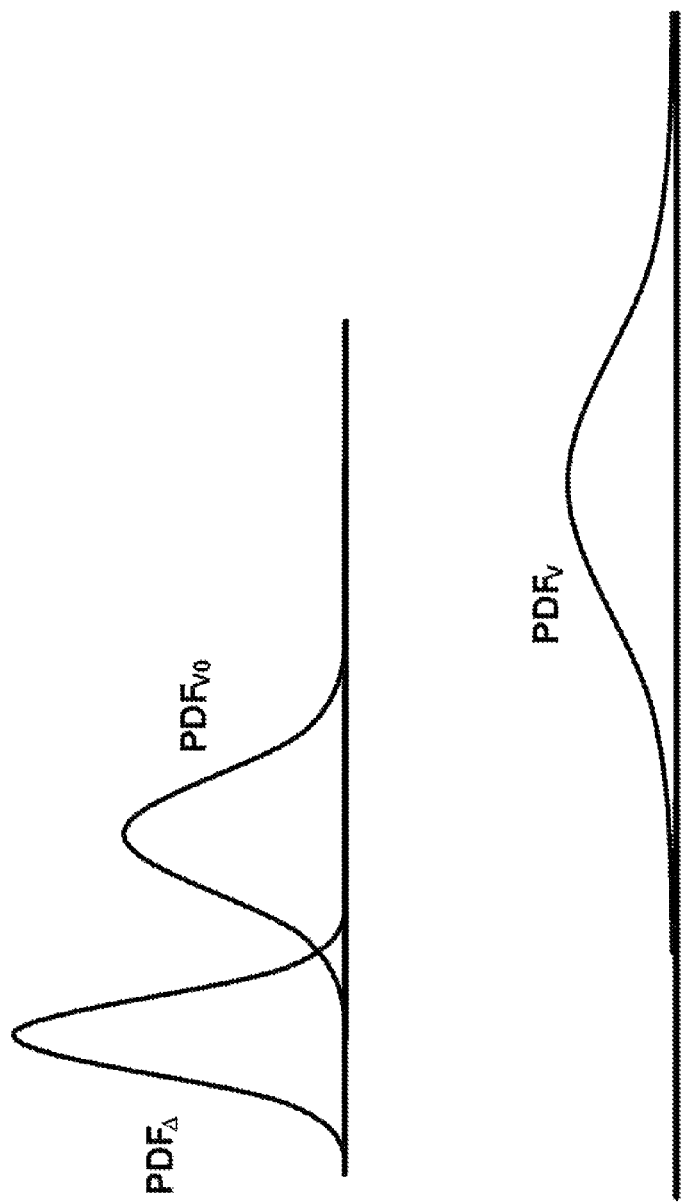
FIG. 6 is an illustrative drawing showing hypothetical curves for $PDF_V$ as determined from a convolution $PDF_A$ and $PDF_{V0}$ in accordance with some embodiments of the invention.

FIG. 6 is an illustrative drawing showing hypothetical curves for $PDF_V$ as determined from a convolution $PDF_A$ and $PDF_{V_0}$ in accordance with some embodiments of the invention. The $PDF_{V_0}$ is determined using SSTA based upon victim net signal transitions in the absence of crosstalk. The $PDF_V$ curve therefore represents a probability density function within a victim net driver timing window of victim net driver circuit arrival time under the influence of crosstalk. The $PDF_V$ curve, therefore, provides a provides a probability density function for victim net switching transition that takes into account crosstalk effects.

It will be appreciated that a computer program instructions encoded in computer readable medium may be use to cause a computer program system (not shown) to perform an SSTA of a circuit design that involves use of a victim net driver circuit signal transition arrival time PDF under the crosstalk effect in accordance with embodiments of the invention. Such program instructions may include computation of $PDF_A$ and $PDF_V$ in accordance with the above formulations, for example.

Figure 7:
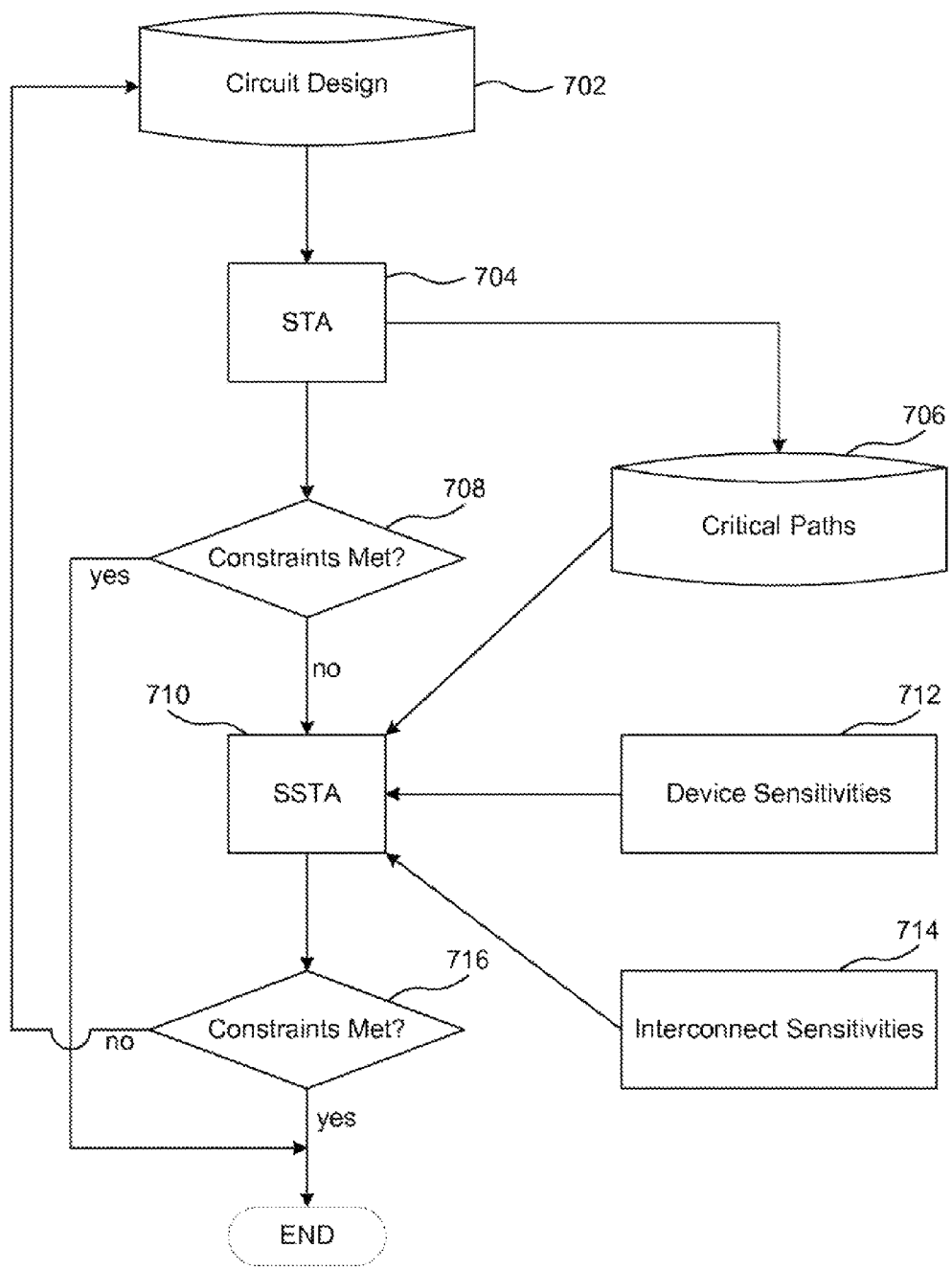
FIG. 7 is an illustrative diagram of a conventional design process flow incorporating SSTA.

FIG. 7 is an illustrative diagram of a conventional design process flow incorporating SSTA. Block 702 involves use of an automated computer program based circuit design tool to generate a circuit design. STA block 704 involves use of a computer program based tool to perform STA of at least a portion of the circuit design generated by block 702. STA block 704 reports critical paths, if any are detected, to a storage 706. Decision block 708 determines whether the STA has determined that all timing constraints are satisfied by the circuit design. If they are, then the process flow proceeds to END. If decision block 708 determines that STA has identified exist timing constraints that are not satisfied by the circuit design, then process flow proceeds to SSTA block 710. SSTA block 710 involves use of a computer program based tool that uses device sensitivity information 712 and interconnect sensitivity information 714 to perform SSTA of critical paths identified in storage 706. Decision block 716 determines, based at least in part upon $PDF_V$ information, whether the SSTA has determined that all timing constraints are satisfied by the circuit. If they are, then the process flow proceeds to END. If decision block 716 determines that SSTA has identified exist timing constraints that are not satisfied by the circuit design, then process flow proceeds back to the circuit design generation block 702. A designer may provide input causing the block 702 to generate a revised circuit design that is changed so as to meet the timing constraints that were violated by the prior version of the circuit design. The process repeats until all timing constraints are satisfied.

SSTA in accordance with some embodiments of the invention uses a $PDF_V$ to determine whether a revised circuit design. For example, if the $PDF_V$ for a given victim net indicates a high probability that a transition occurs too late, then victim net driver size and thus its drive power might be increased to meet switching time requirements. On the other hand, for example, if the $PDF_V$ for the given victim net indicates there is a significant safe time margin in victim net switching then the victim net driver size and thus its drive power might be decreased so as to optimize power consumption or area.

Figure 8:
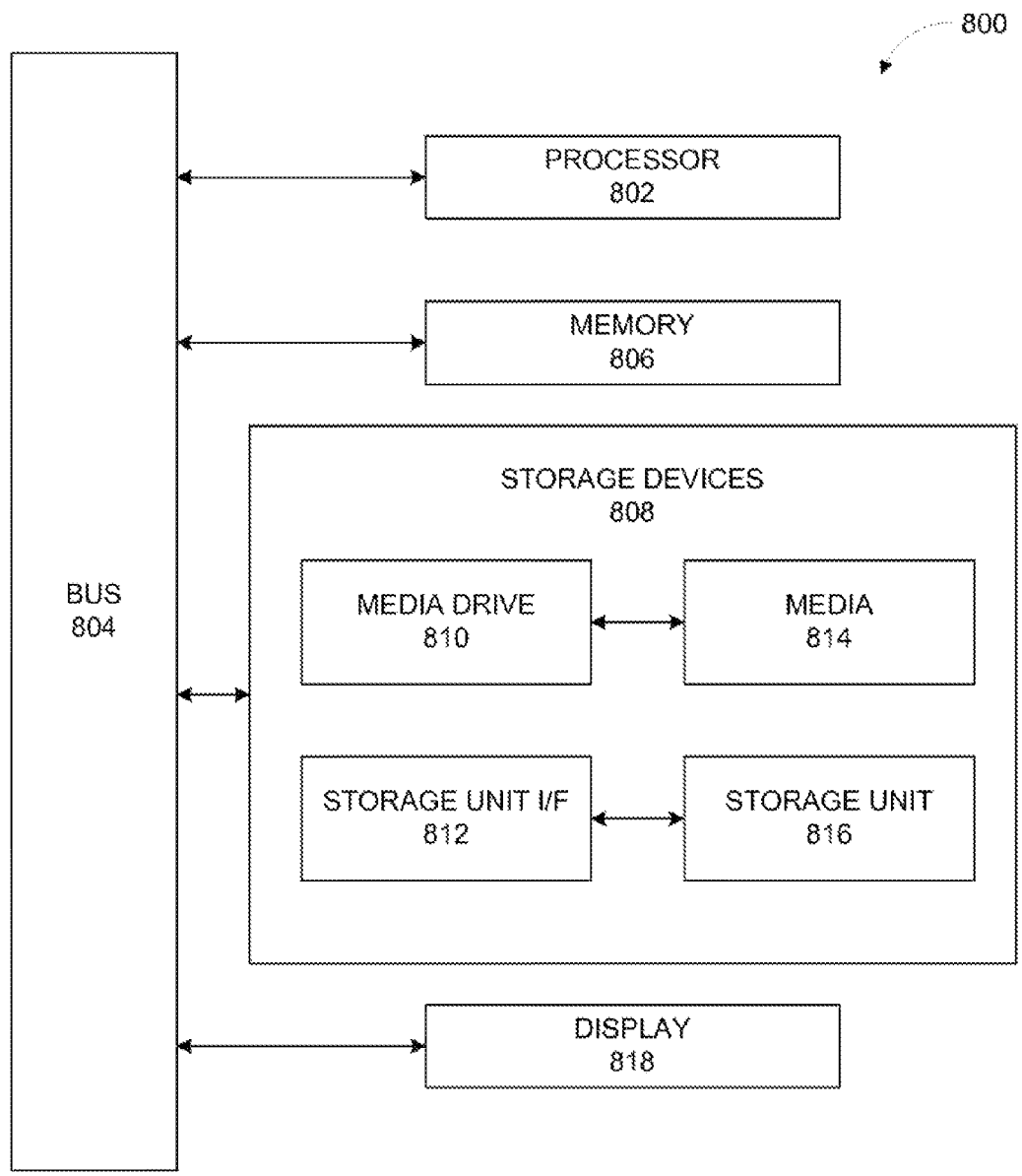
FIG. 8 is an illustrative block level diagram of a computer system that can be programmed to produce $PDF_A$ and $PDF_V$ in accordance with some embodiments of the invention.

FIG. 8 is an illustrative block level diagram of a computer system 800 that can be programmed to produce PDFS, $PDF_A$ and $PDF_V$ in accordance with some embodiments of the invention. Computer system 800 can include one or more processors, such as a processor 802. Processor 802 can be implemented using a general or special purpose processing engine such as, for example, a microprocessor, controller or other control logic. In the example illustrated in FIG. 8, processor 802 is connected to a bus 804 or other communication medium.

Computing system 800 also can include a main memory 806, preferably random access memory (RAM) or other dynamic memory, for saving information such as, PDFS, $PDF_A$ and $PDF_V$ and for storing computer program instructions, such as code to perform STA and/or SSTA. Main memory 806 also may be used for storing temporary variables or for buffering other intermediate information such as delay change curve information in the course of packet formation during execution of instructions to be executed by processor 802. Computer system 800 can likewise include a read only memory ("ROM") or other static storage device coupled to bus 804 for storing static information and instructions for processor system 902. Moreover, the main memory 806 and the persistent storage devices 808 may store data such as PDF information for various circuits or design database or a computer program such as an integrated circuit design simulation process involving the use of SST or SSTA, for example.

The persistent storage devices 808 may include, for example, a media drive 810 and a storage interface 812. The media drive 810 can include a drive or other mechanism to support storage media 814. For example, a hard disk drive, a floppy disk drive, a magnetic tape drive, an optical disk drive, a CD or DVD drive (R or RW), or other removable or fixed media drive. Storage media 814, can include, for example, a hard disk, a floppy disk, magnetic tape, optical disk, a CD or DVD, or other fixed or removable medium that is read by and written to by media drive 810. Information storage mechanism 808 also may include a storage unit 816 in communication with interface 812.

The (one or more) processors 802 may be programmed using a simulation program to perform simulations of an integrated circuit design. Simulation results in the form of multi-thread streaming data are temporarily buffered in memory 806. The computer system 800 also includes a user interface (UI) display unit 818 that can be used to display information such as simulation waveform results.

In this document, the terms "computer program medium" and "computer useable medium" are used to generally refer to media such as, for example, memory 806, storage devices 808, a hard disk installed in hard disk drive 810. These and other various forms of computer useable media may be involved in carrying one or more sequences of one or more instructions to processor 802 for execution. Such instructions, generally referred to as "computer program code" (which may be grouped in the form of computer programs or other groupings), when executed, enable the computing system 800 to perform features or functions of the present invention as discussed herein.

It will be understood that the foregoing description and drawings of preferred embodiment in accordance with the present invention are merely illustrative of the principles of this invention, and that various modifications can be made by those skilled in the art without departing from the scope and spirit of the invention.

The invention claimed is:

1. A method to evaluate crosstalk effect of aggressor switching upon victim net signal transition time within an integrated circuit comprising:
   obtaining a first probability density function (PDF) of aggressor switching time in response to a first input signal to an aggressor net driver;
   obtaining a second PDF of aggressor switching time in response to a second input signal to the aggressor net driver;
   combining the first and second probability density functions to produce a combination curve;
   using at least one processor circuit, determining a delay change curve that represents aggressor-dependent delay change of arrival time of a victim net driver signal transition; and
   determining a third PDF of delay change of a transition of the victim net driver signal based upon the combination curve and the delay change curve, including determining a region of the combination curve in which an integral of such region indicates a time interval in which there will be an occurrence of an aggressor signal transition.

2. The method of claim 1,
wherein the first PDF and the second PDF overlap.

3. The method of claim 1,
wherein determining the third PDF includes determining a ratio of a value of the combination curve at a given point of the combination curve to a rate of change of the delay change curve at a corresponding point of the delay change curve.

4. The method of claim 1,
wherein determining the third PDF includes:
determining a region of the combination curve in which delay change is maximal.

5. The method of claim 1,
wherein determining the third PDF includes:
determining a region of the combination curve in which delay change is maximal; and
determining the third PDF includes determining a ratio of a value of the combination curve at a given point of the combination curve within the determined region to a rate of change of the delay change curve at a corresponding point of the delay change curve.

6. The method of claim 5,
wherein the integral of such region of the combination curve is one.

7. The method of claim 1,
wherein determining the third PDF includes computing a formulation, $$PDF(\delta) = \sum_{f(t_i)=\delta} \frac{PDFS(t_i)}{|f'(t_i)|}$$

where $PDF(\delta)$ represents the third PDF; function $f(t)$ represents the delay change curve; $|f'(t_i)|$ represents absolute value of a rate of change of the delay change curve aggressor switching time point $t_i$ for a given value of the delay change curve $f(t_i)=\delta$; and $PDFS(t_i)$ represents the value of the PDFS curve a point of that curve aligned with the time point $t_i$ in the delay change curve $f(t_i)$.

8. The method of claim 1 further including:
saving the third PDF to computer readable memory.

9. The method of claim 1,
wherein determining the third PDF includes:
determining an alignment of the combination curve and the delay change curve in which an integral of the delay indicates a time interval in which there will be an occurrence of an aggressor signal transition and in which delay change is maximal.

10. The method of claim 1,
wherein combining the first and second probability density functions includes summing the first and second probability density functions.

11. The method of claim 1 further including:
obtaining a fourth PDF of nominal victim net driver transition time; and
determining a fifth PDF of the victim net signal transition time based upon the third PDF and the fourth PDF.

12. The method of claim 11,
wherein determining the fifth PDF includes computing an integral of the third PDF and the fourth PDF over victim net switching times.

13. The method of claim 11 further including:
saving the fifth PDF to computer readable memory.

14. The method of claim 11 further including:
revising a design for a victim net based upon a fifth PDF determined for such victim net.

15. A method to evaluate crosstalk effect of aggressor switching upon victim net signal transition time within an integrated circuit comprising:
   obtaining respective probability density functions (PDFs) of multiple respective aggressor switching times;
   combining the multiple probability density functions to produce a combination curve representing a combination of the multiple PDFs;
   using at least one processor circuit, determining a delay change curve that represents aggressor-dependent delay change of arrival time of a victim net driver signal transition; and
   determining a third PDF of delay change of a transition of the victim net driver signal based upon the combination curve and the delay change curve, including determining a region of the combination curve in which an integral of such region indicates a time interval in which there will be an occurrence of an aggressor signal transition.

16. An article of manufacture that includes a non-transitory and tangible computer readable medium encoded with computer readable instructions to perform a method comprising:
- obtaining a first probability density function (PDF) of aggressor switching time in response to a first input signal to an aggressor net driver;
- obtaining a second PDF of aggressor switching time in response to a second input signal to the aggressor net driver;
- combining the first and second probability density functions to produce a combination curve representing a combination of the first and second PDF curves;
- determining a delay change curve that represents aggressor-dependent delay change of arrival time of a victim net driver signal transition; and
- determining a third PDF of delay change of a transition of the victim net driver signal based upon the combination curve and the delay change curve, including determining a region of the combination curve in which an integral of such region indicates a time interval in which there will be an occurrence of an aggressor signal transition.

17. The article of claim 16 wherein the method further includes:
- obtaining a fourth PDF of nominal victim net driver transition time; and
- determining a fifth PDF of the victim net signal transition time based upon the third PDF and the fourth PDF.

18. An apparatus that includes:
- a processor;
- a non-transitory and tangible computer readable storage medium; and
- a communication medium coupling the processor and the computer readable storage medium;
- wherein the non-transitory and tangible computer readable storage medium is encoded with computer readable instructions to perform a method comprising:
  - obtaining a first probability density function (PDF) of aggressor switching time in response to a first input signal to an aggressor net driver;
  - obtaining a second PDF of aggressor switching time in response to a second input signal to the aggressor net driver;
  - combining the first and second probability density functions to produce a combination curve representing a combination of the first and second PDF curves;
  - determining a delay change curve that represents aggressor-dependent delay change of arrival time of a victim net driver signal transition; and
  - determining a third PDF of delay change of a transition of the victim net driver signal based upon the combination curve and the delay change curve, including determining a region of the combination curve in which an integral of such region indicates a time interval in which there will be an occurrence of an aggressor signal transition.

19. The system of claim 18, wherein the method further includes:
- obtaining a fourth PDF of nominal victim net driver transition time; and
- determining a fifth PDF of the victim net signal transition time based upon the third PDF and the fourth PDF.

* * * * *